United States Patent
Sato et al.

(10) Patent No.: US 10,415,779 B2
(45) Date of Patent: Sep. 17, 2019

(54) VEHICLE HEADLIGHT

(71) Applicant: Koito Manufacturing Co., Ltd., Tokyo (JP)

(72) Inventors: Noriko Sato, Shizuoka (JP); Hiroyuki Ishida, Shizuoka (JP)

(73) Assignee: KOITO MANUFACTURING CO. LTD., Tokyo (JP)

( * ) Notice: Subject to any disclaimer, the term of this patent is extended or adjusted under 35 U.S.C. 154(b) by 0 days.

(21) Appl. No.: 15/428,409

(22) Filed: Feb. 9, 2017

(65) Prior Publication Data

US 2017/0153000 A1  Jun. 1, 2017

Related U.S. Application Data

(63) Continuation of application No. PCT/JP2015/071922, filed on Aug. 3, 2015.

(30) Foreign Application Priority Data

Aug. 11, 2014 (JP) .................... 2014-163763

(51) Int. Cl.
*F21S 41/00* (2018.01)
*F21S 41/32* (2018.01)
(Continued)

(52) U.S. Cl.
CPC .............. *F21S 41/00* (2018.01); *F21S 41/147* (2018.01); *F21S 41/321* (2018.01);
(Continued)

(58) Field of Classification Search
CPC .............. F21S 48/1352; F21S 48/1358; F21S 48/1364; F21S 48/137; F21S 48/1376; F21S 48/1382; F21S 48/1388
See application file for complete search history.

(56) References Cited

U.S. PATENT DOCUMENTS 5,416,671 A * 5/1995 Uchida ............... F21S 48/1376
                                                      362/346
5,876,114 A   3/1999 Nino
(Continued)

FOREIGN PATENT DOCUMENTS

CN     1206089       1/1999
CN     1299029 A     6/2001
(Continued)

OTHER PUBLICATIONS

International Search Report from International Application No. PCT/JP2015/071922, dated Oct. 20, 2015.
(Continued)

*Primary Examiner* — Alexander K Garlen
(74) *Attorney, Agent, or Firm* — Buchanan Ingersoll & Rooney PC

(57) ABSTRACT

An ADB lamp unit of a vehicle headlamp includes a light source constituted by a plurality of semiconductor light-emitting elements that can be turned on/off individually, and a reflector having a reflective surface that is based on a paraboloid of revolution. The reflector is constituted by a perpendicularly split plurality of partial reflectors, with the reflective surface of each partial reflector being configured such that the horizontal spread of reflected light reflected by each partial reflectors is approximately equal in a predetermined projection plane.

5 Claims, 17 Drawing Sheets

(51) Int. Cl.
*F21S 41/33* (2018.01)
*F21S 41/36* (2018.01)
*F21S 41/43* (2018.01)
*F21S 41/147* (2018.01)
*F21S 41/365* (2018.01)
*F21S 41/663* (2018.01)
*B60Q 1/14* (2006.01)
*F21S 45/47* (2018.01)

(52) U.S. Cl.
CPC .......... *F21S 41/335* (2018.01); *F21S 41/336* (2018.01); *F21S 41/36* (2018.01); *F21S 41/43* (2018.01); *F21S 41/663* (2018.01); *B60Q 1/1423* (2013.01); *B60Q 2300/056* (2013.01); *B60Q 2300/41* (2013.01); *B60Q 2300/45* (2013.01); *F21S 41/365* (2018.01); *F21S 45/47* (2018.01)

(56) References Cited

U.S. PATENT DOCUMENTS

| | | | |
|---|---|---|---|
| 6,000,816 A | 12/1999 | Serizawa et al. | |
| 2002/0118548 A1* | 8/2002 | Kuenstler | B60Q 1/2696 362/518 |
| 2004/0252517 A1* | 12/2004 | Ishida | F21S 48/1159 362/465 |
| 2008/0225540 A1* | 9/2008 | Tsukamoto | F21S 48/1159 362/514 |
| 2009/0027911 A1* | 1/2009 | Misawa | B60Q 1/0058 362/518 |
| 2009/0097269 A1* | 4/2009 | Stauss | F21S 48/1159 362/539 |
| 2009/0284980 A1* | 11/2009 | Iwasaki | F21S 48/1159 362/517 |
| 2010/0309676 A1* | 12/2010 | Lin | F21S 48/1159 362/517 |
| 2011/0038171 A1* | 2/2011 | Uchida | F21S 48/1159 362/519 |
| 2013/0135889 A1* | 5/2013 | Okubo | B60Q 1/04 362/518 |
| 2013/0188377 A1* | 7/2013 | Konishi | B60Q 1/04 362/511 |
| 2014/0056018 A1 | 2/2014 | Brendle | |
| 2014/0307459 A1* | 10/2014 | Brendle | F21S 48/1159 362/520 |
| 2015/0241011 A1* | 8/2015 | Bauer | F21S 48/1159 362/514 |

FOREIGN PATENT DOCUMENTS

| | | |
|---|---|---|
| CN | 1401935 A | 3/2003 |
| CN | 101581428 A | 11/2009 |
| CN | 102102840 A | 6/2011 |
| CN | 102278686 A | 12/2011 |
| CN | 102434834 A | 5/2012 |
| CN | 103256546 A | 8/2013 |
| DE | 102012202290 A1 | 8/2013 |
| JP | H02-148601 A | 6/1990 |
| JP | 2003-059316 A | 2/2003 |
| JP | 2012-119219 A | 6/2012 |
| JP | 2013-243080 A | 12/2013 |
| JP | 2014137896 A | 7/2014 |

OTHER PUBLICATIONS

International Preliminary Report on Patentability from International Application No. PCT/JP2015/071922, dated Oct. 20, 2015.
Office Action dated Jun. 19, 2018 for the corresponding Chinese Patent Application No. 201580043346.2 with English Translation.
European Extended Search Report dated Jun. 27, 2018 for the corresponding European Patent Application No. 15831602.6.
Office Action dated Mar. 8, 2019, by the Chinese Patent Office in corresponding Chinese Patent Application No. 201580043346.2 and English translation of the Office Action. (19 pages).
Office Action (Notification of Reason for Refusal) dated Jan. 29, 2019, by the Japanese Patent Office in corresponding Japanese Patent Application No. 2016-542536 and English translation of the Office Action. (6 pages).

* cited by examiner

VEHICLE HEADLIGHT

CROSS-REFERENCE TO RELATED APPLICATIONS

This application is based upon and claims the benefit of priority from the prior Japanese Patent Application No. 2014-163763, filed on Aug. 11, 2014 and International Patent Application No. PCT/JP2015/071922, filed on Aug. 3, 2015, the entire content of each of which is incorporated herein by reference.

BACKGROUND OF THE INVENTION

1. Field of the Invention

The present invention relates to vehicle headlamps.

2. Description of the Related Art

Vehicle headlamps provided with a light-emitting element array constituted by a plurality of semiconductor light-emitting elements that are configured to be capable of irradiating respective individual irradiation regions divided sideways at a level above the horizon are known. With such vehicle headlamps, by detecting the location of vehicles running in front and of pedestrians, and controlling the light-emitting element array so as not to shine on the individual irradiation regions that correspond to the location, adaptive driving beams (ADBs) that keep glare off the drivers of vehicles travelling in front and off pedestrians can be realized (see, for example, Patent Document 1).

Patent Document 1: JP2013-243080

Attempting to implement an ADB by combining a light-emitting element array such as described above with reflectors having a reflective surface that is based on a paraboloid of revolution leads to problems in that the light-distribution pattern formed by the light reflected by the reflectors for each light-emitting element may narrow in width, or image may rotate, where the pattern is the more perpendicularly upward on the virtual screen, such that a light-distribution pattern having the desired irradiation region cannot be obtained.

An object of the present invention, brought about in view of the above-discussed issues, is to make available technology for realizing an ADB in a vehicle headlamp provided with a reflector having a reflective surface that is based on a paraboloid of revolution.

SUMMARY OF THE INVENTION

The present invention in a certain aspect is a vehicle headlamp that includes a light source constituted by a plurality of individually on/off switching-enabled semiconductor light-emitting elements, and a reflector having a reflective surface that is based on a paraboloid of revolution. The reflector is constituted by a perpendicularly split plurality of partial reflectors whose reflective surfaces are each configured such that horizontal spread of reflected light, reflected by the partial reflectors, in a predetermined projection plane is approximately equal for each partial reflector.

BRIEF DESCRIPTION OF THE DRAWINGS

Embodiments will now be described, by way of example only, with reference to the accompanying drawings, which are meant to be exemplary, not limiting, and wherein like elements are numbered alike in several Figures, in which.

DETAILED DESCRIPTION OF THE INVENTION

Figure 1:
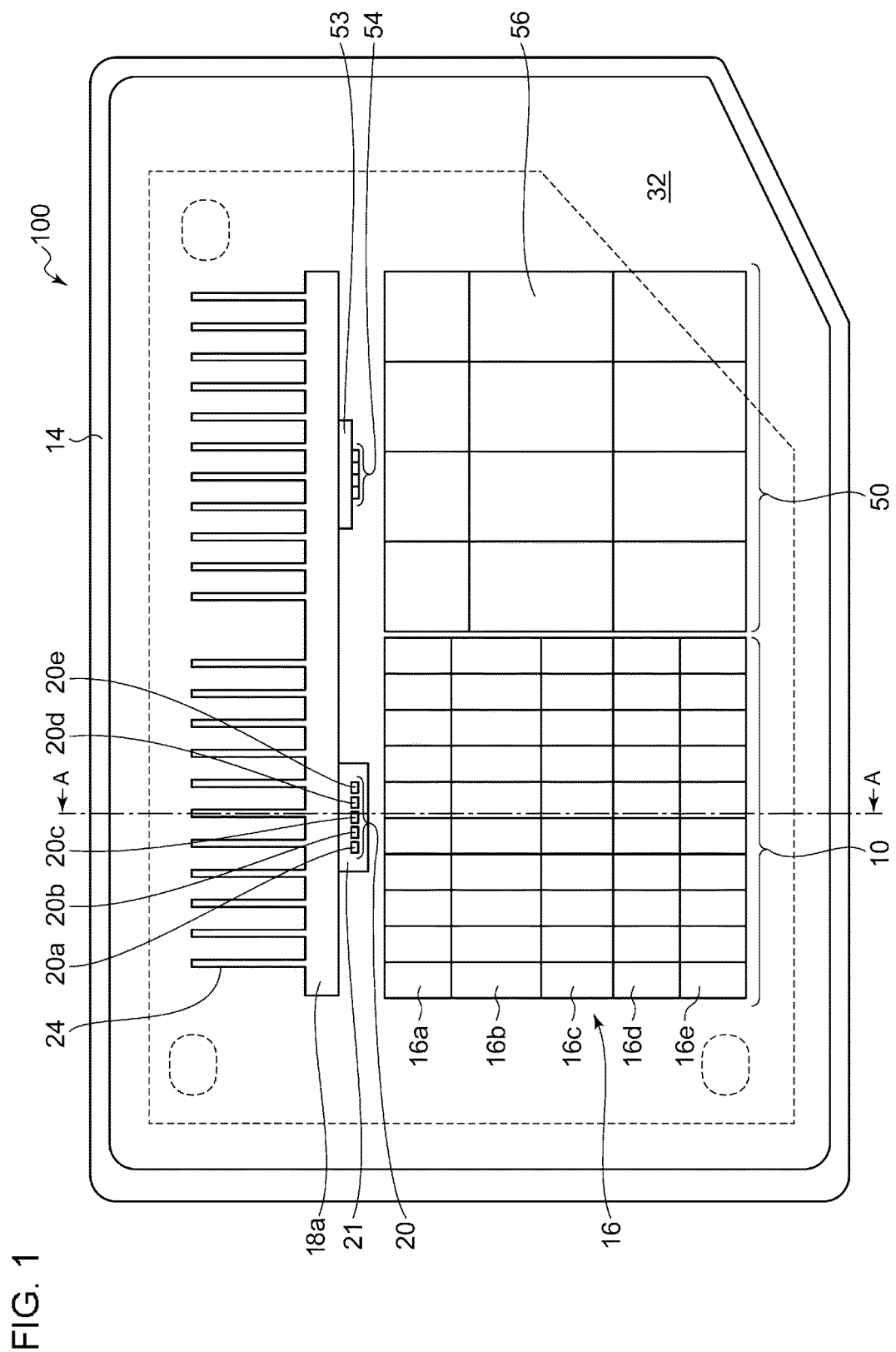
FIG. 1 is a front view of a vehicle headlamp according to an embodiment of the present invention.

The present invention in a certain aspect is a vehicle headlamp that includes a light source constituted by a plurality of individually on/off switching-enabled semiconductor light-emitting elements, and a reflector having a reflective surface that is based on a paraboloid of revolution. The reflector is constituted by a perpendicularly split plurality of partial reflectors whose reflective surfaces are each configured such that horizontal spread of reflected light, reflected by the partial reflectors, in a predetermined projection plane is approximately equal for each partial reflector.

According to this aspect, the divergences in the horizontal direction of irradiation regions formed by the reflected light from the partial reflectors can be made uniform, and thus an ADB with an appropriate light-distribution pattern that extends in the vertical direction with little variation in width can be achieved.

The present invention in a different aspect is a vehicle headlamp that includes a light source constituted by a plurality of individually on/off switching-enabled semiconductor light-emitting elements, and a reflector having a reflective surface that is based on a paraboloid of revolution. The reflector is constituted by a perpendicularly split plurality of partial reflectors whose reflective surfaces are each configured such that reflected light reflected by the partial reflectors spreads from an upper end to a lower end of each partial reflector's light-distribution pattern formed on a predetermined projection plane.

Each partial reflector's vehicle fore-aft position may be adjusted such that the partial reflectors' focal lengths decrease with increasing separation of the partial reflectors from the light source. With this configuration, the divergences in the horizontal direction of the irradiation regions formed by the reflected light from the partial reflectors can be made further uniform.

The reflective surface of the partial reflectors may be constituted by a plurality of horizontally split partial reflective surfaces, and the horizontally oriented angles of light reflected by the partial reflective surfaces differ. With this configuration, an unevenness in the luminous intensity in a light-distribution pattern can be reduced.

The partial reflective surfaces may be configured such that horizontal directionality of light reflected by the partial reflective surfaces spreads outward from centrally positioned of the partial reflective surfaces edgewise positioned of the partial reflective surfaces. With this configuration, an unevenness in the luminous intensity in a light-distribution pattern associated with the presence of a space between the light-emitting elements can be reduced.

The reflective surface of the partial reflectors may be constituted by concave and convex partial reflective surfaces rowed in alternation. With this configuration, an unevenness in the luminous intensity in alight-distribution pattern associated with the presence of a space between the light-emitting elements can be further reduced.

The light source may be disposed such that its optical axis is directed perpendicularly downward, and a second reflective surface extending approximately parallel to the optical axis of the light source may be further provided in proximity to the light source and opposite from the light source's reflector side. With this configuration, glare light or loss light from the light source that is not incident on the reflector can be reflected by the second reflective surface and made incident on the reflector.

FIG. 1 is a front view of a vehicle headlamp 100 according to an embodiment of the present invention. The vehicle headlamp 100 is mounted on the front right of a vehicle. The basic configuration of a vehicle headlamp mounted on the front left of the vehicle is similar to that of the vehicle headlamp 100, and thus descriptions thereof will be omitted.

The vehicle headlamp 100 includes a lamp body 12 having an opening formed therein on a side toward the front of the vehicle and a transparent or semi-transparent front cover 14 mounted to the lamp body 12 so as to cover the opening. An ADB lamp unit 10 and a low-beam lamp unit 50 are housed in a lamp room 32 defined by the lamp body 12 and the front cover 14.

The low-beam lamp unit 50 includes, as a light source, a light-emitting element array 54 constituted by a plurality of (four, in this example) semiconductor light-emitting elements, such as white light-emitting diodes (LEDs). The light-emitting element array 54 is mounted on a circuit board 53. Light emitted by the light-emitting element array 54 is reflected toward the front of the vehicle by a reflector 56 having a reflective surface that is based on a paraboloid of revolution and forms a low-beam light-distribution pattern. The configuration of the low-beam lamp unit 50 is well known, and thus detailed descriptions thereof will be omitted.

Figure 2:
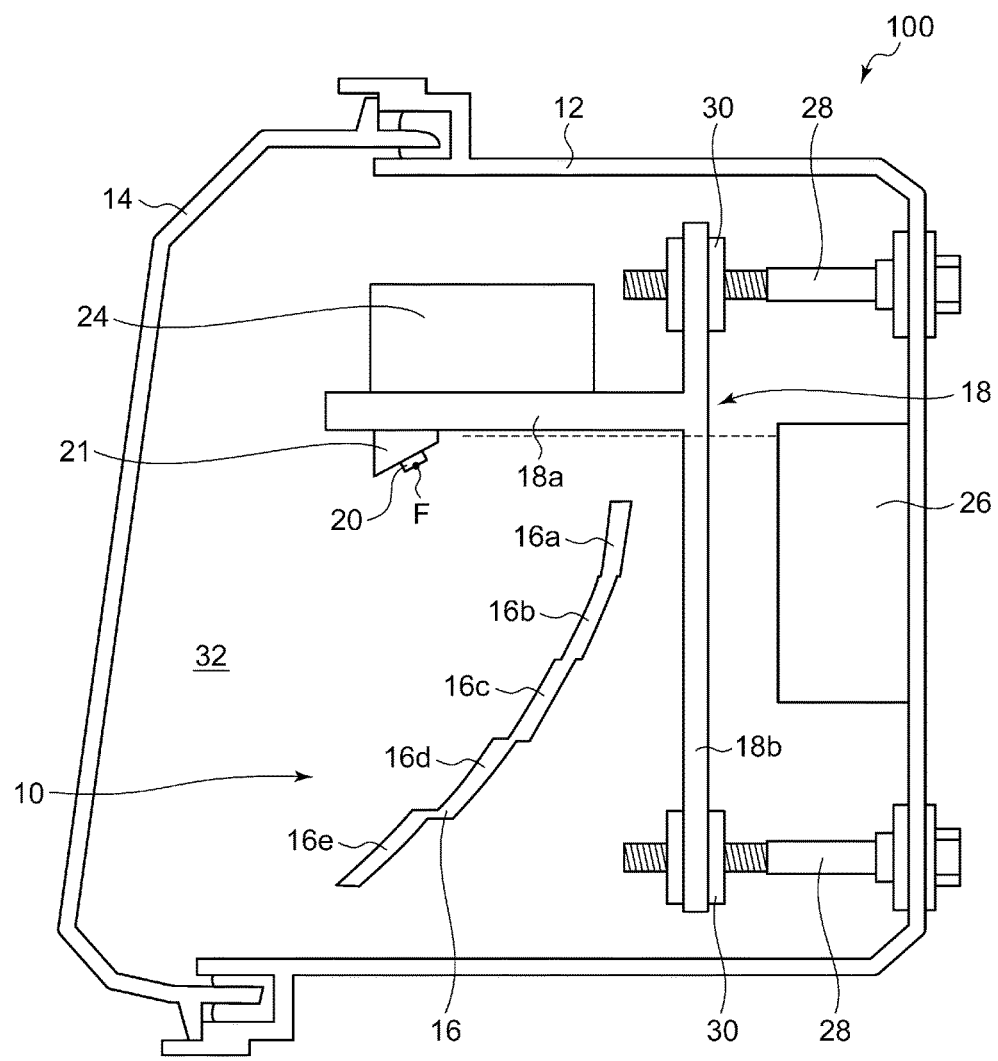
FIG. 2 is a schematic sectional view of an ADB lamp unit cut along a vertical plane passing through the A-A line in FIG. 1.

FIG. 2 is a schematic sectional view of the ADB lamp unit 10 cut along a vertical plane passing through the A-A line in FIG. 1.

The ADB lamp unit 10 includes, as a light source, a light-emitting element array 20 constituted by a plurality of (five, in this example) semiconductor light-emitting elements 20a through 20e, such as white LEDs. The light-emitting element array 20 is mounted, facing downward, on a circuit board 21 having a lower surface that is inclined toward a reflector 16 at an angle of 41° relative to a horizontal plane.

The light-emitting elements 20a through 20e constituting the light-emitting element array 20 are, for example, formed into a rectangular shape having an identical height and are disposed linearly on the lower surface of the circuit board 21. The light-emitting elements are configured to be capable of being turned on/off individually, and as each of the light-emitting elements emits light, an image of each light is projected on a virtual vertical screen located in front of the vehicle headlamp.

It is preferable that the light-emitting elements 20a through 20e be disposed as densely as possible such that the space between the light-emitting elements is approximately 0.1 mm, for example. A reason for this is that, if a space is present between the light-emitting elements, a dark portion is produced in a light-distribution pattern on the virtual vertical screen.

A support member 18 is shared by the ADB lamp unit 10 and the low-beam lamp unit 50. The support member 18 has a substantially T-like shape in the sectional view of FIG. 2. The circuit board 21 for the ADB lamp unit 10 and the circuit board 53 for the low-beam lamp unit 50 are disposed on the lower surface of a horizontal plate 18a of the support member 18 that extends in the horizontal direction. A number of heat-dissipating fins 24 are erected on the upper surface of the horizontal plate 18a so as to dissipate heat emitted by the light-emitting element arrays 20 and 54.

Two aiming screws 28 are supported on the lamp body 12 so as to be freely rotatable but restricted from moving in the front and back direction. An aiming nut 30 is mounted at each of the upper and lower ends of a vertical plate 18b of the support member 18 that extends in the vertical direction. The support member 18 is supported on the lamp body 12 with the aiming screws 28 threaded into the aiming nuts 30 interposed therebetween.

The mounting position and the mounting angle of the support member 18 relative to the lamp body 12 can be fine-tuned by rotating the aiming screws 28 so as to adjust the tightening of the aiming nuts 30. With this fine tuning, aiming of adjusting the optical axes of the ADB lamp unit 10 and the low-beam lamp unit 50 in the vertical direction and/or the horizontal direction is achieved. The aiming screws 28 may be rotated manually or may be rotationally driven by an actuator (not illustrated).

The reflector 16 having a reflective surface that is based on a paraboloid of revolution with its focal point F lying on the surface of the light-emitting elements is disposed vertically underneath the light-emitting element array 20. The reflector 16 is constituted by a plurality of partial reflectors 16a through 16e that are elongated in the horizontal direction. Light emitted by the light-emitting element array 20 is reflected by the reflective surfaces of the partial reflectors 16a through 16e and illuminates a space in front of the vehicle.

The light-emitting element array 20 is electrically connected to a lighting control unit 26 mounted to the lamp body 12.

The lighting control unit 26 detects the position of a pedestrian or a vehicle in front of the own vehicle with the use of a camera, a laser, or the like (not illustrated) mounted on the vehicle and controls the on/off of the light-emitting elements 20a through 20e individually so as not to irradiate a region that corresponds to the detected position. With this configuration, a shaded high-beam light-distribution pattern that reduces glare given to the driver of the vehicle in front or to the pedestrian can be formed. Turning on all of the light-emitting elements results in a normal high-beam light-distribution pattern.

Figure 3A:
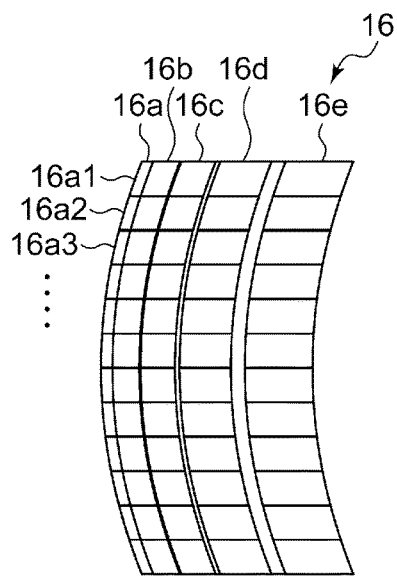
FIG. 3A is a plan view of a reflective surface of a reflector as viewed from vertical above.
Figure 3B:
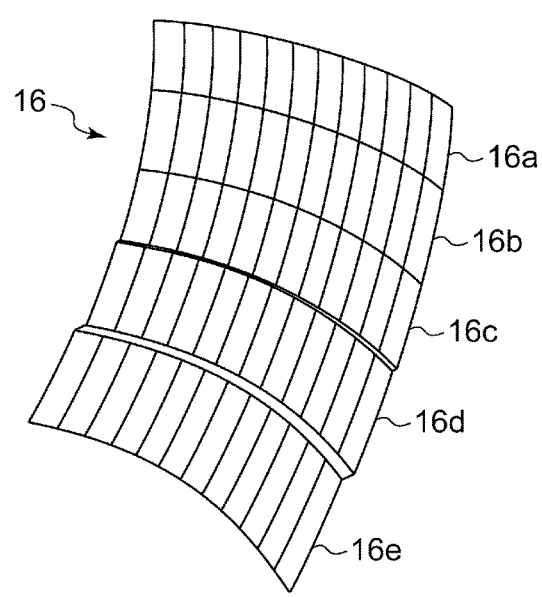
FIG. 3B is a perspective view of the reflector as viewed from the side of the reflective surface.

FIG. 3A is a plan view of the reflective surface of the reflector 16 as viewed from vertically above, and FIG. 3B is a perspective view of the reflector 16 as viewed from the side of the reflective surface.

The reflector 16 is constituted by five partial reflectors 16a through 16e that are divided in the vertical direction and elongated in the horizontal direction. A step may be formed between the partial reflectors (e.g., between the partial reflectors 16d and 16e) or the partial reflectors may be continuous (e.g., between the partial reflectors 16a and 16b).

The partial reflectors 16a through 16e each have a reflective surface that is based on a paraboloid of revolution. The reflective surfaces of the partial reflectors 16a through 16e may form a continuous curved surface that is elongated in the horizontal direction, or the reflective surface of each of the partial reflectors may be further divided into a plurality of partial reflective surfaces. The latter case will be described later with reference to FIGS. 12 through 14.

In the present embodiment, an ADB light-distribution pattern having an appropriate irradiation region can be achieved with the use of a reflector divided into a plurality of partial reflectors. This will be described hereinafter with reference to FIGS. 4A, 4B, 5A, 5B, 6, 7A through 7D, and 8A through 8D.

Figure 4A:
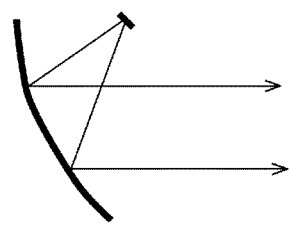
FIGS. 4A, 4B, 5A and 5B illustrates exemplary trajectories and light-distribution patterns of reflected light of a conventional reflector that is not divided into partial reflectors.
Figure 5A:
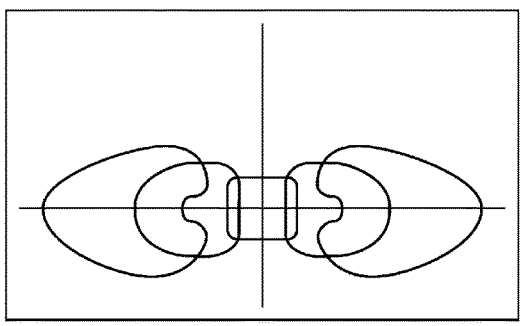

FIG. 4A illustrates a trajectory of reflected light when a reflector is a simple paraboloid of revolution. In this case, the reflected light is not diffused in the vertical direction, and thus a light-distribution pattern on a virtual screen illuminates only the vicinity of a horizontal line, as illustrated in FIG. 5A.

Figure 4B:
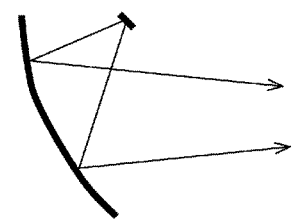

FIG. 4B illustrates a trajectory of reflected light when a reflector is designed to diffuse light in the vertical direction but is not divided into partial reflectors. In this case, a light-distribution pattern on the virtual screen takes a distorted shape such as the one illustrated in FIG. 5B. With this light-distribution pattern, a portion enclosed by a dotted line in FIG. 5B is not illuminated, and thus such a light-distribution pattern is not suitable for either a high-beam light-distribution pattern or a shaded high-beam light-distribution pattern.

Figure 5B:
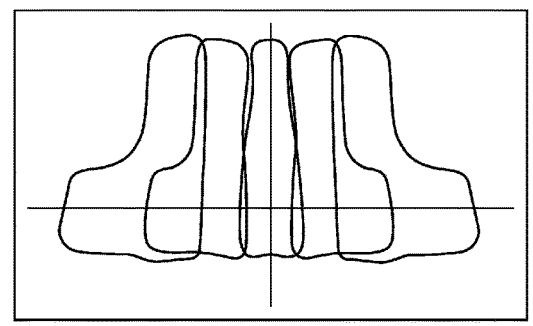

FIGS. 6, 7A through 7B, and 8A through 8D are illustrations for describing a reason why a light-distribution pattern such as the one illustrated in FIG. 5B is formed.

Figure 6:
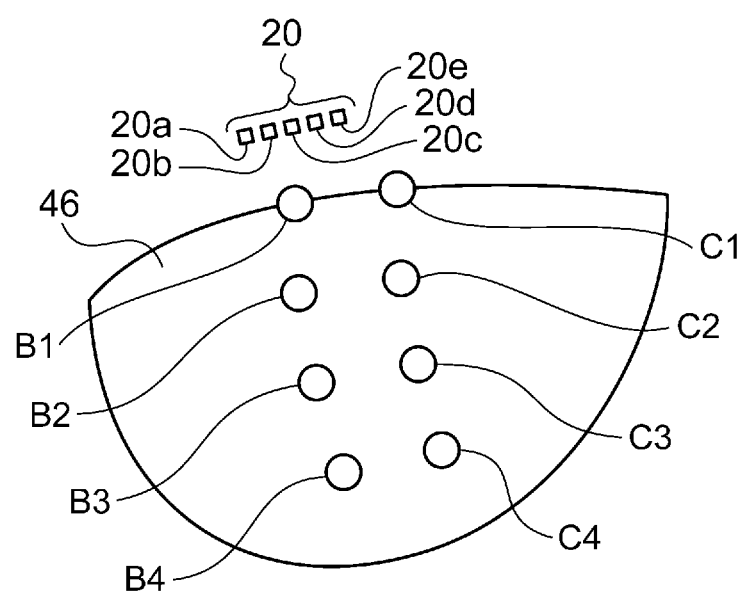
FIGS. 6, 7A through 7D, and 8A through 8D are illustrations for describing changes in the size and the inclination of a light source image associated with a difference in the reflection position on a conventional reflector.
Figure 7A:
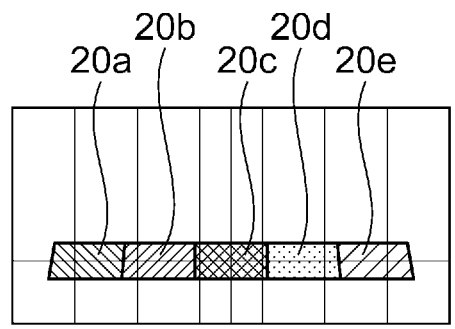
Figure 7B:
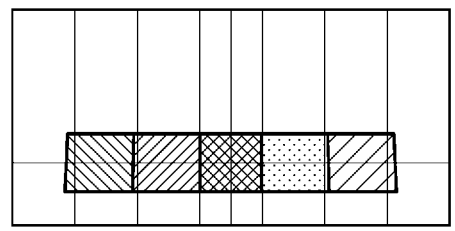
Figure 7C:
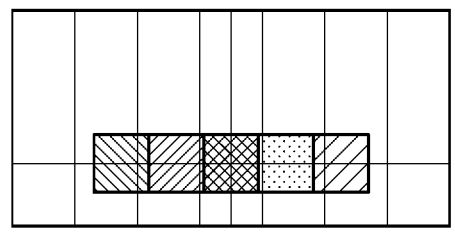
Figure 7D:
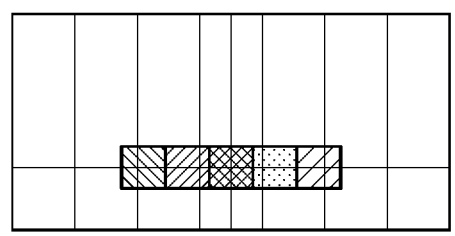
Figure 8A:
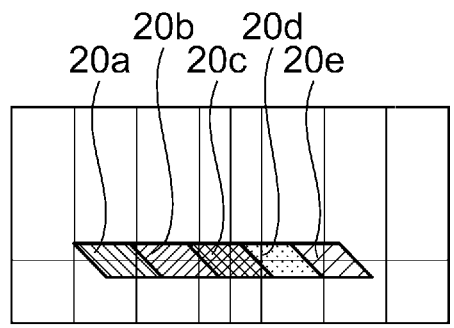
Figure 8B:
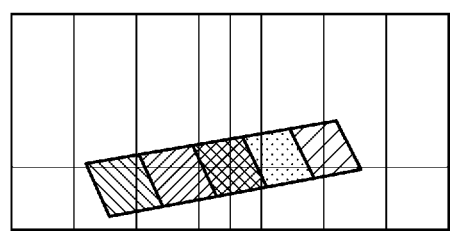
Figure 8C:
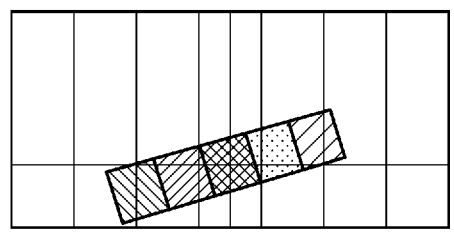
Figure 8D:
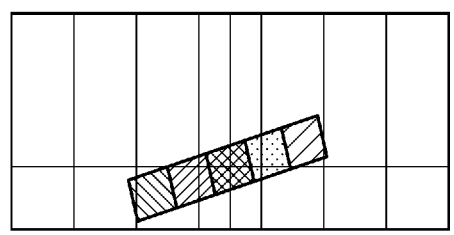

A reflector 46 illustrated in FIG. 6 is a reflector designed to diffuse light in the vertical direction, as illustrated in FIG. 5B. FIGS. 7A through 7D and 8A through 8D illustrate reflection images formed on the virtual screen when light emitted by the five light-emitting elements 20a through 20e constituting the light-emitting element array 20 is reflected by the reflector 46 at points B1 through B4 and C1 through C4, respectively. Five hatching types in each of FIGS. 7A through 7D and 8A through 8D indicate that these are the reflection images of the respective light-emitting elements 20a through 20e.

Comparison of FIGS. 7A through 7D reveals that, as the reflection point on the reflector 46 becomes farther from the light-emitting elements (i.e., in order of B1, B3, B3, and B4), the size of the reflection image decreases, and the reflection images are more clustered toward the center. In addition, FIGS. 8A through 8D reveal that the reflection images are rotated when the reflection point on the reflector 46 is offset from the center of the reflector and that the angle of inclination increases as the reflection point becomes farther from the light-emitting elements (i.e., in order of C1, C2, C3, and C4).

The light-distribution pattern illustrated in FIG. 5B corresponds to what is obtained by superimposing FIGS. 7A through 7D. In this manner, a distorted light-distribution pattern is formed by a reflector that is not divided into partial reflectors and that includes only a single reflective surface based on a paraboloid of revolution.

Therefore, in the present embodiment, a reflector is constituted by a plurality of partial reflectors divided in the vertical direction, and the reflective surfaces of the respective partial reflectors are designed such that the divergences in the horizontal direction of the reflected light reflected by the respective partial reflectors are substantially equal.

Figure 9:
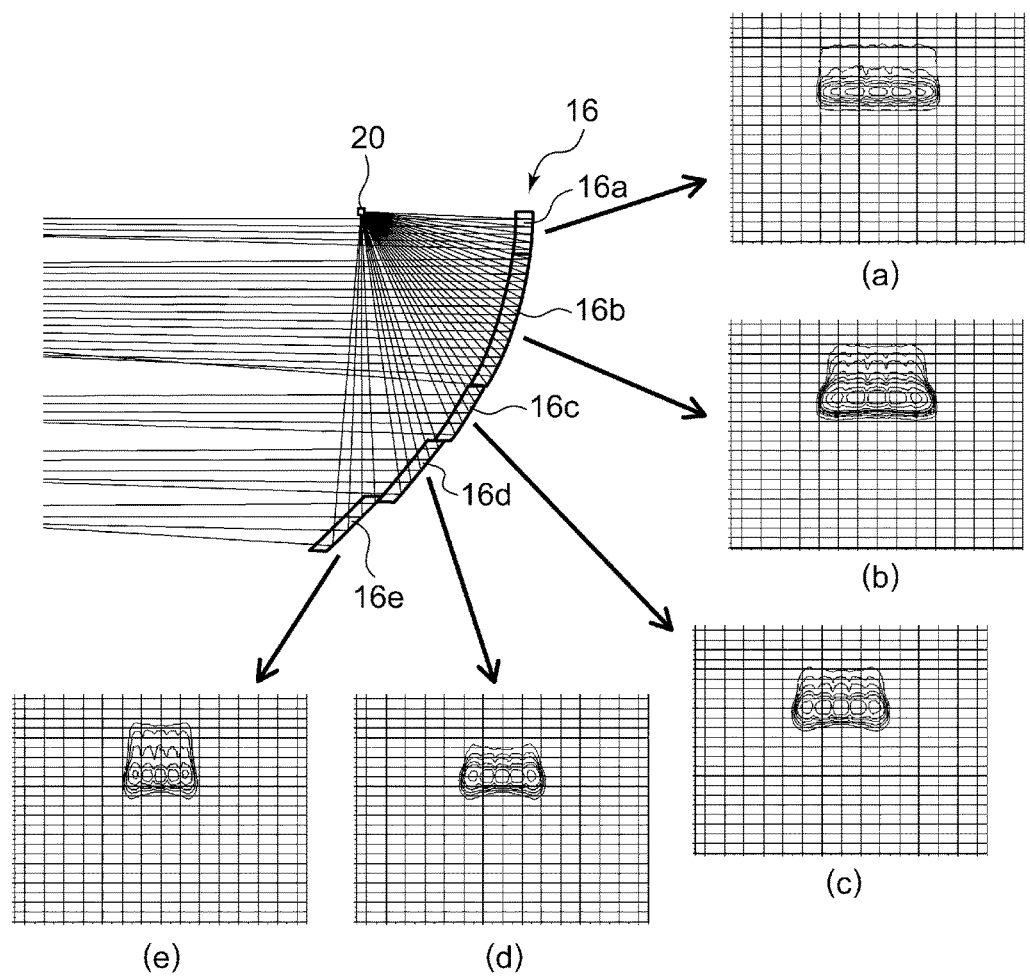
FIG. 9 illustrates trajectories and light-distribution patterns of reflected light of a reflector according to an embodiment of the present invention.

FIG. 9 illustrates trajectories of reflected light from the reflective surface of the reflector 16 configured as described above. The reflector 16 is constituted by the partial reflectors 16a through 16e, as described above. Each of the partial reflectors diffuses the reflected light in the vertical direction. Sections (a) through (e) of FIG. 9 illustrate irradiation regions formed on the virtual screen by the reflected light from the partial reflectors 16a through 16e, respectively. Sections (a) through (e) reveal that the divergences in the horizontal direction of the reflected light from the partial reflectors 16a through 16e are substantially equal. The outermost outlines of the irradiation regions illustrated in sections (a) through (e) each indicate the line of 100 cd (the line that results in 1 lux on the screen that is 10 meters ahead).

Figure 10:
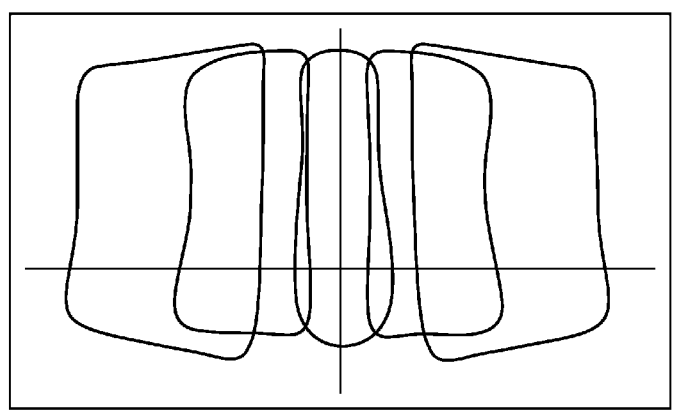
FIG. 10 illustrates a light-distribution pattern formed by the reflector illustrated in FIG. 9.

FIG. 10 illustrates an overall light-distribution pattern formed by the reflector 16 illustrated in FIG. 9. This light-distribution pattern corresponds to what is obtained by superimposing the irradiation regions illustrated in sections (a) through (e) of FIG. 9. In this manner, making the divergences in the horizontal direction of the reflected light from the partial reflectors on the virtual screen uniform makes it possible to form an appropriate high-beam light-distribution pattern or shaded high-beam light-distribution pattern that extends in the vertical direction with little variation in width.

As described above, the reflection image of the light-emitting element is more rotated as the light is reflected at a position farther from the center of the reflector. Thus, the reflector 16 of the present embodiment has a shape obtained by cutting out only a portion of a paraboloid of revolution that is close to the center so as to eliminate the influence of rotation as much as possible.

Figure 11:
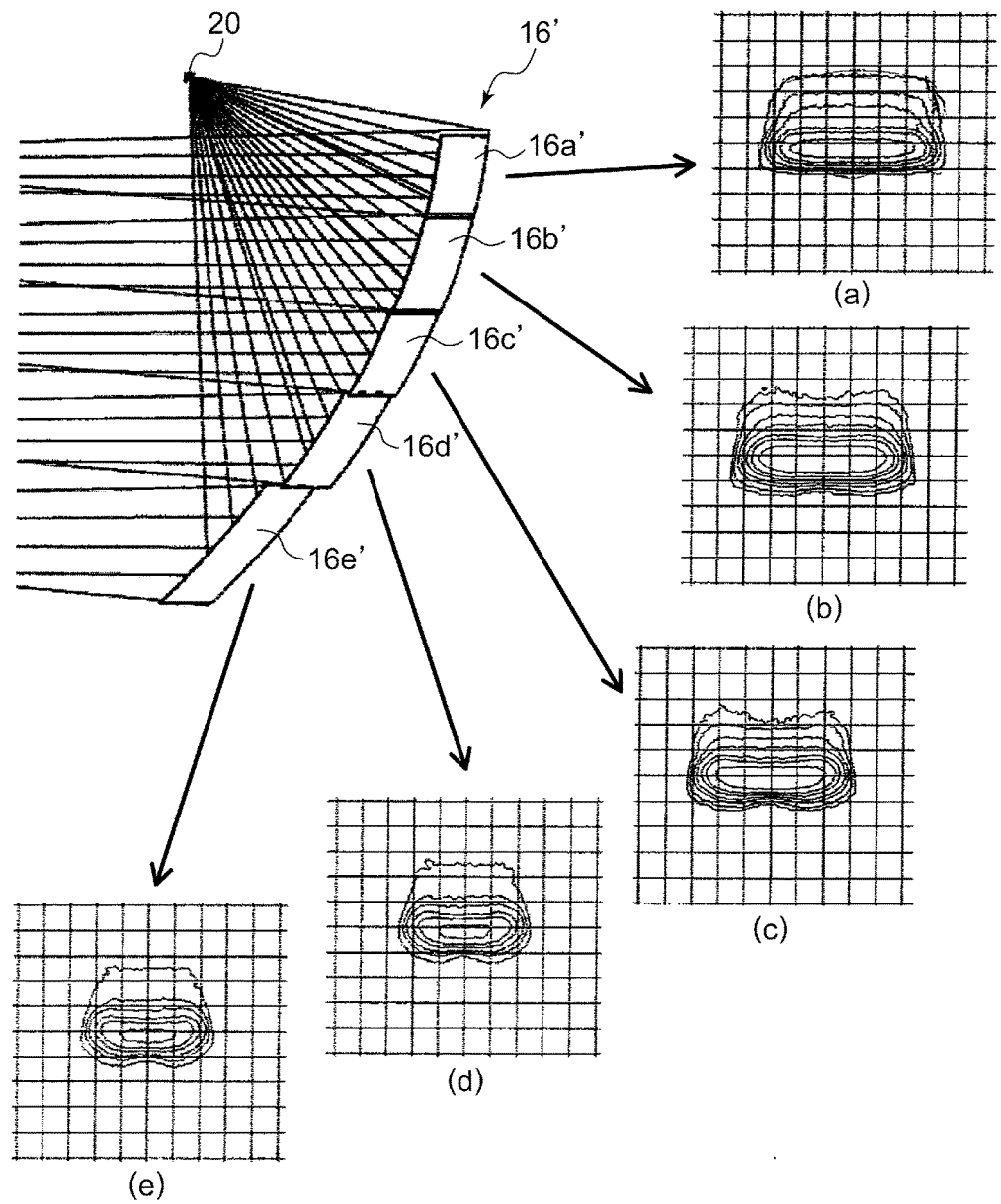
FIG. 11 illustrates trajectories and light-distribution patterns of reflected light of a reflector according to another embodiment.

FIG. 11 illustrates trajectories of reflected light from reflective surfaces of a reflector 16' according to another embodiment. The reflector 16' is constituted by partial reflectors 16a' through 16e'. Sections (a) through (e) of FIG. 11 illustrate irradiation regions formed on the virtual screen by the reflected light from the partial reflectors 16a' through 16e', respectively. In this embodiment, the reflective surfaces of the partial reflectors 16a' through 16e' are configured such that the reflected light reflected by the partial reflectors 16a' through 16e' spreads from an upper end to a lower end of a light-distribution pattern formed on a predetermined projection plane. The outermost outlines of the irradiation regions illustrated in sections (a) through (e) indicate the line of 100 cd (the line that results in 1 lux on the screen that is 10 meters ahead).

As described thus far, according to the present embodiment, an ADB having an appropriate light-distribution pattern can be achieved in a vehicle headlamp in which a light-emitting element array is combined with a reflector having a reflective surface that is based on a paraboloid of revolution. With such a vehicle headlamp, the number of necessary components can be kept small, and the manufacturing cost can be reduced, as compared to a vehicle headlamp that implements an ADB with the use of a projection lens and a reflector having a reflective surface that is based on an ellipsoid of revolution. In addition, since a projection lens is not used, there is an advantage in that the chromatic aberration does not occur.

The positions of the partial reflectors 16a through 16e in the front and back direction of the vehicle may be adjusted so that the focal length of the partial reflector decreases as the distance from the light-emitting element array 20 to the partial reflectors 16a through 16e increases. As an example, the following settings may be employed: f=25 for the partial reflector 16a, f=25 for the partial reflector 16b, f=24.8 for the partial reflector 16c, f=24.5 for the partial reflector 16d, and f=23.7 for the partial reflector 16e. With these settings, the divergences in the horizontal direction of the reflected light from the partial reflectors can be made further uniform. The focal points of all of the partial reflectors 16a through 16e are located on the light-emitting element array.

The number of partial reflectors that constitute the reflector 16 is not limited to five, and an appropriate number of partial reflectors can be selected such that a light-distribution pattern having an appropriate shape can be obtained.

As described above, the light source of the ADB lamp unit 10 of the present embodiment is a light-emitting element array in which a plurality of light-emitting elements are arrayed linearly, and thus it is structurally inevitable that a space is produced between the light-emitting elements. Due to this space, a dark portion associated with the space between the light-emitting elements is generated in a light-distribution pattern formed by the ADB lamp unit 10 (see the arrows in section (a) of FIG. 12), and thus an unevenness in the luminous intensity is generated in the light-distribution pattern.

Hereinafter, a configuration for reducing an unevenness in the luminous intensity in a light-distribution pattern associated with a space between the light-emitting elements will be described.

In the present embodiment, as illustrated in FIGS. 3A and 3B, the reflective surfaces of the partial reflectors 16a through 16e are each constituted by a plurality of partial reflective surfaces divided in the horizontal direction. For example, the reflective surface of the partial reflector 16a is constituted by partial reflective surfaces 16a1, 16a2, 16a3, . . . . In addition, the reflective surface is designed such that the angle of the reflected light from each partial reflective surface in the horizontal direction differs for the different partial reflective surfaces. Configuring the partial reflective surfaces such that the reflected light is diffused in the horizontal direction makes a dark portion in a light-distribution pattern less noticeable.

Figure 12:
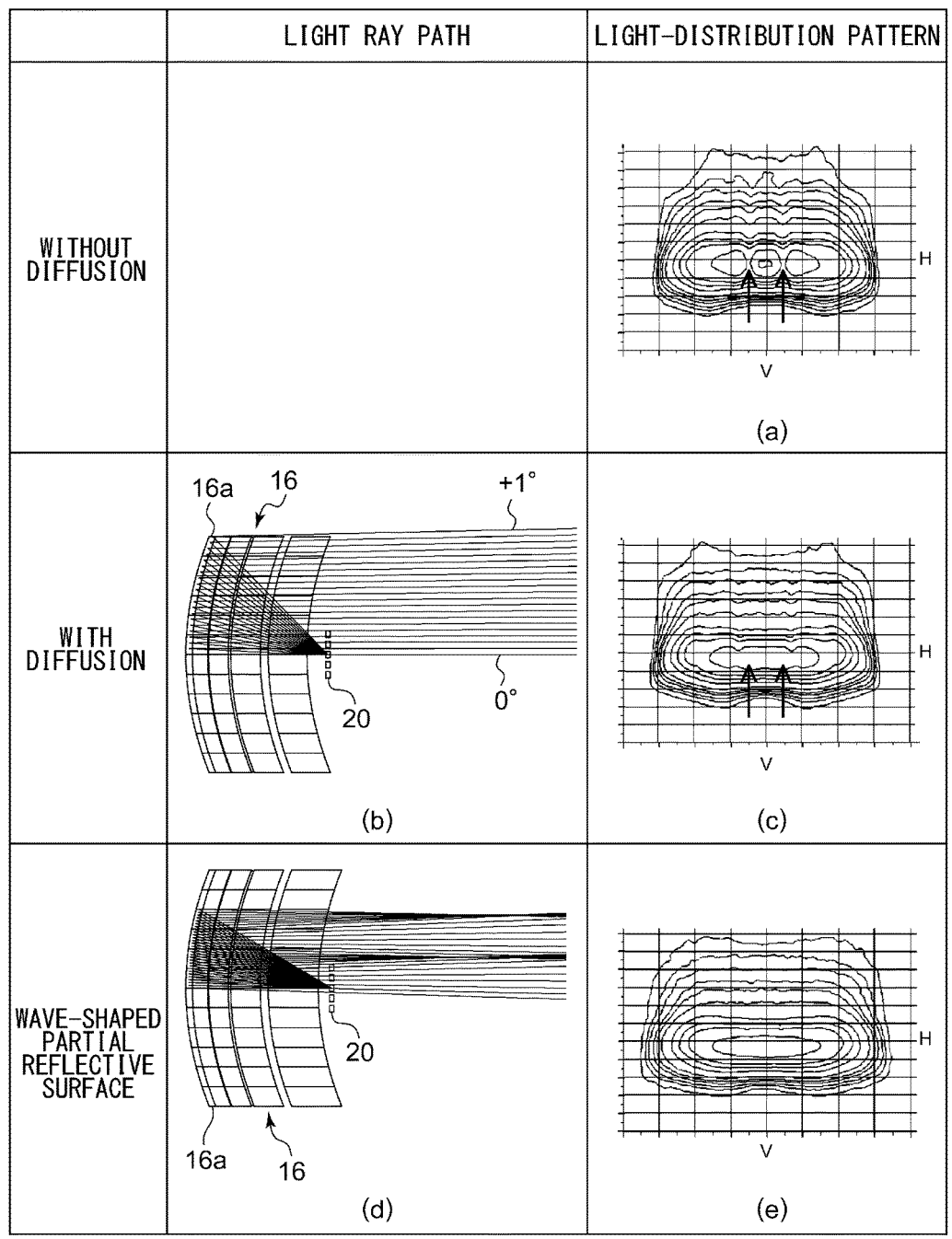
FIG. 12 illustrates a change in a light-distribution pattern associated with the presence/absence of a configuration that diffuses reflected light in the horizontal direction.

As an example, the partial reflective surfaces are configured such that the direction in the horizontal direction of the reflected light from the partial reflective surfaces diverges outward from the partial reflective surface located at the center to the partial reflective surface located at an edge portion. This is illustrated in section (b) of FIG. 12. Section (b) of FIG. 12 illustrates the paths of the reflected light from the partial reflective surfaces constituting the partial reflector 16a. Of the partial reflective surfaces, the partial reflective surface located at the center of the reflector is configured such that the reflected light therefrom is parallel to the optical axis. The partial reflective surface located at an edge portion of the reflector is configured such that the reflected light therefrom is offset outward only by 1° relative to the optical axis. Section (c) of FIG. 12 illustrates a light-distribution pattern in a case in which the direction in which the reflected light from the partial reflective surfaces is slightly varied, as illustrated in section (b) of FIG. 12. As compared to section (a) of FIG. 12, it can be seen that the dark portions indicated by the arrows are less noticeable.

Figure 13:
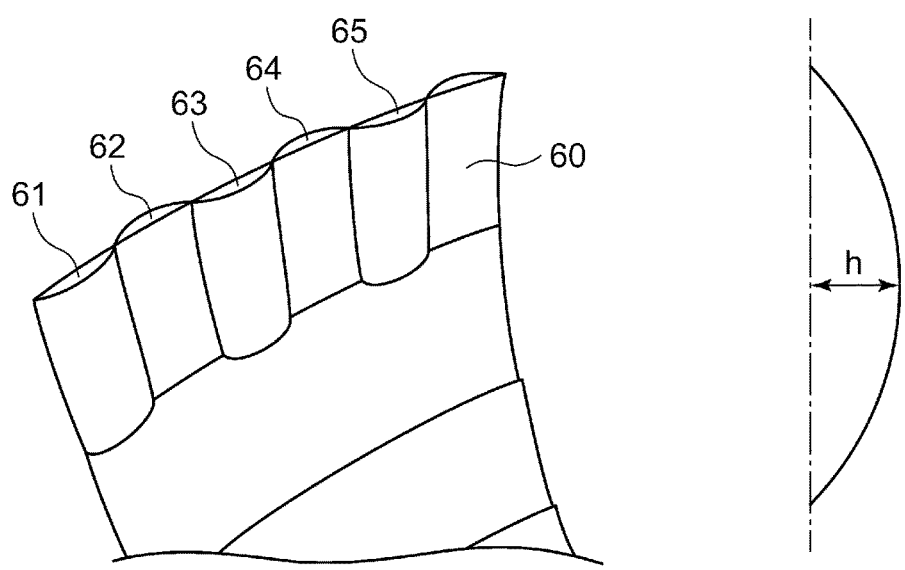
FIG. 13 illustrates an example of a partial reflective surface having a wave shape.

The partial reflector may be configured such that a concave partial reflective surface and a convex partial reflective surface are disposed in an alternating manner. FIG. 13 illustrates a configuration in which convex partial reflective surfaces 61, 63, and 65 and concave partial reflective surfaces 62 and 64 are disposed in an alternating manner in a single partial reflector 60. The distance from the reference plane indicated by the dashed-dotted line in FIG. 13 to the vertex of each of the concave surfaces and the convex surfaces is represented by a maximum height h. As an example, the space between the light-emitting elements in the light-emitting element array is 0.1 mm, and the reflected light from the partial reflective surfaces is diffused by approximately 1° in the horizontal direction. In this case, the following settings are employed: the maximum height h1 of the partial reflective surface 61 is 0.0065 mm; the maximum height h2 of the partial reflective surface 62 is 0.007 mm; the maximum height h3 of the partial reflective surface 63 is 0.007 mm; the maximum height h4 of the partial reflective surface 64 is 0.008 mm; and the maximum height h5 of the partial reflective surface 65 is 0.009 mm.

In this manner, when the partial reflective surfaces are formed into a wave shape constituted by concave surfaces and convex surfaces, as illustrated in section (d) of FIG. 12, the direction in the horizontal direction of the reflected light from the partial reflective surfaces varies more than that in the case of section (b) of FIG. 12. Section (e) of FIG. 12 illustrates a light-distribution pattern in a case in which the partial reflective surfaces are formed into a wave shape. As compared to sections (a) and (c) of FIG. 12, it can be seen that the dark portions indicated by the arrows are even less noticeable, and the unevenness in the luminous intensity in the light-distribution pattern is substantially eliminated.

Figure 14:
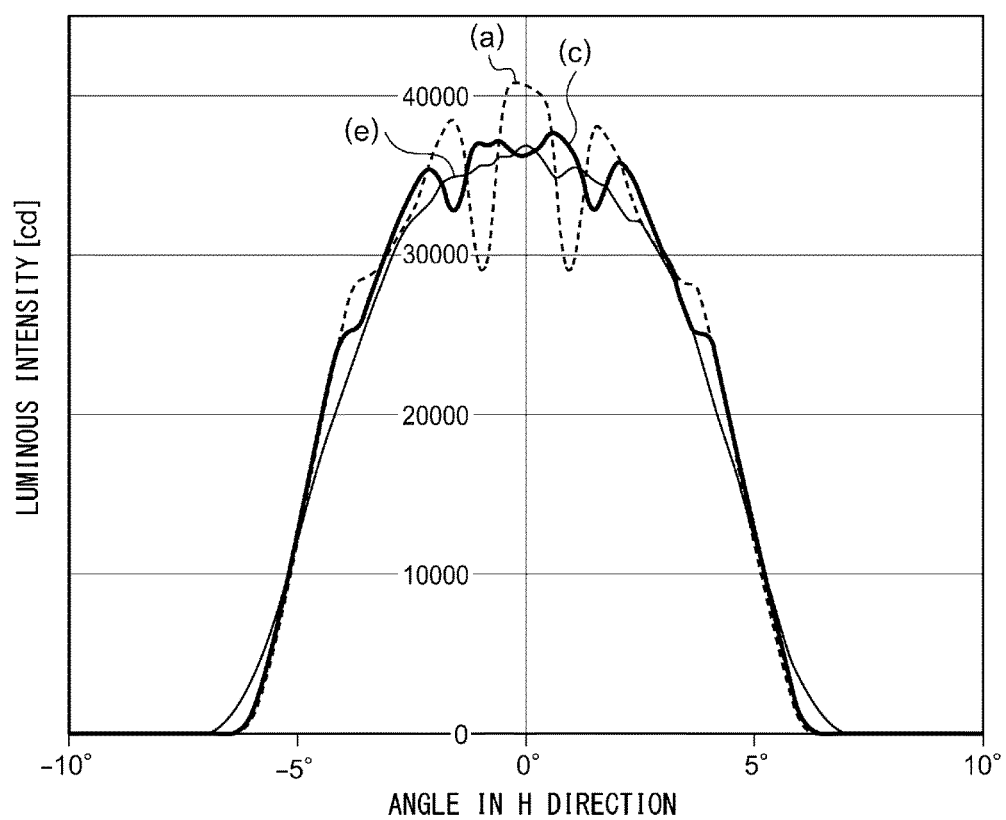
FIG. 14 illustrates the luminous intensities of the light-distribution patterns illustrated in sections (a), (c), and (e) of FIG. 12 in the form of the sectional views.

FIG. 14 illustrates the luminous intensities of the light-distribution patterns illustrated in sections (a), (c), and (e) of FIG. 12 in the form of the sectional views along a horizontal line H. It can be seen that, although large troughs are present in the luminous intensity in the sectional view illustrated in section (a), the troughs in the luminous intensity are smaller in the sectional view illustrated in section (c), and the troughs in the luminous intensity are substantially eliminated in the sectional view illustrated in section (e), resulting in a smooth change in the luminous intensity.

When the space between the light-emitting elements is greater than 0.1 mm, the unevenness in the luminous intensity in the light-distribution pattern can be reduced in a similar manner by making the angle of diffusion in the horizontal direction by the partial reflective surfaces greater than 1° or by making the maximum heights of the concave surfaces and the convex surfaces of the partial reflective surfaces greater than the aforementioned values.

Figure 15:
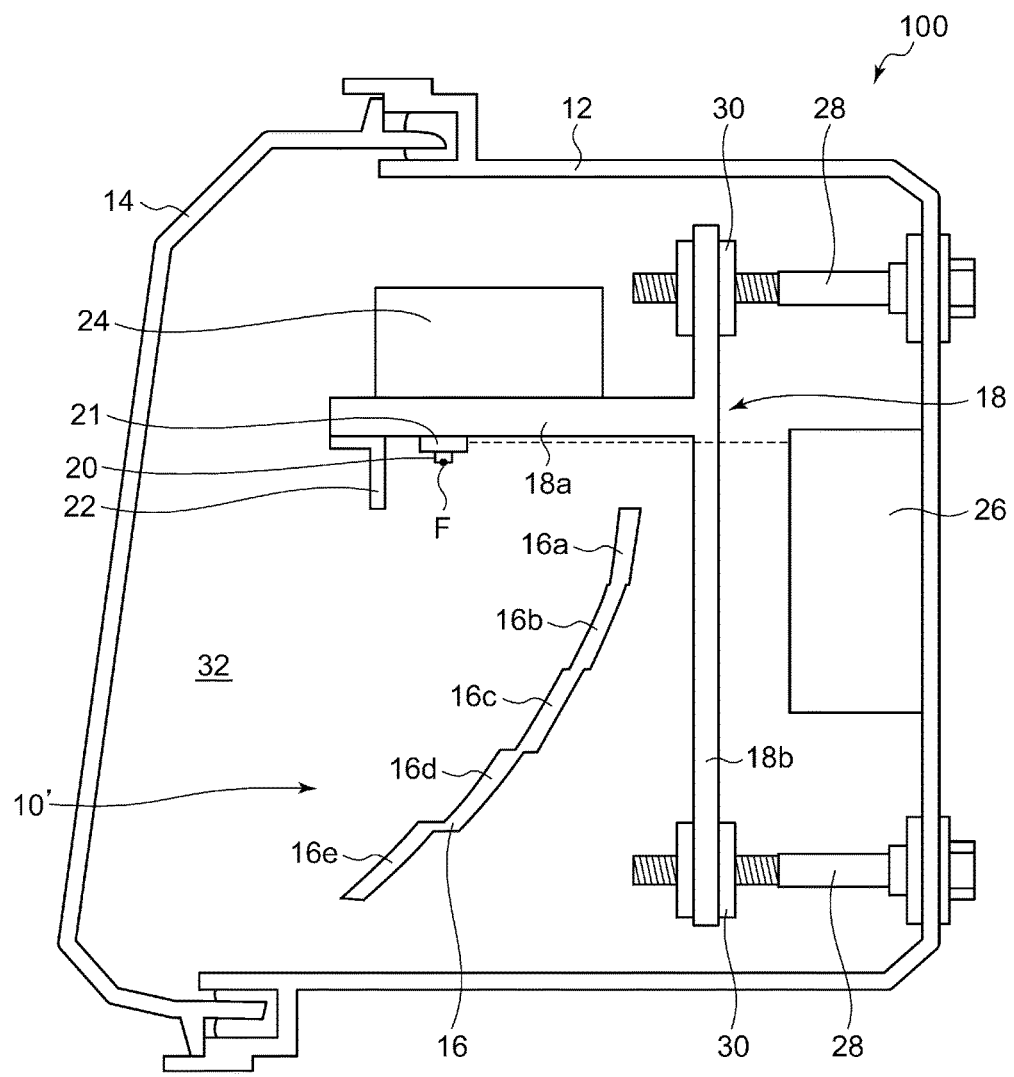
FIG. 15 is a schematic sectional view of an ADB lamp unit according to another embodiment of the present invention cut along a vertical plane.

FIG. 15 is a schematic sectional view of an ADB lamp unit 10' according to another embodiment of the present invention cut along a vertical plane. The ADB lamp unit 10' has a configuration similar to that of the ADB lamp unit 10 illustrated in FIG. 2 except for the points described hereinafter.

In order to ensure a greater space for disposing other structures above the support member 18, it is preferable that the circuit board 21 be mounted substantially horizontally, as illustrated in FIG. 15, without inclining the light-emitting element array 20 toward the reflective surface of the reflector 16.

Figure 16A:
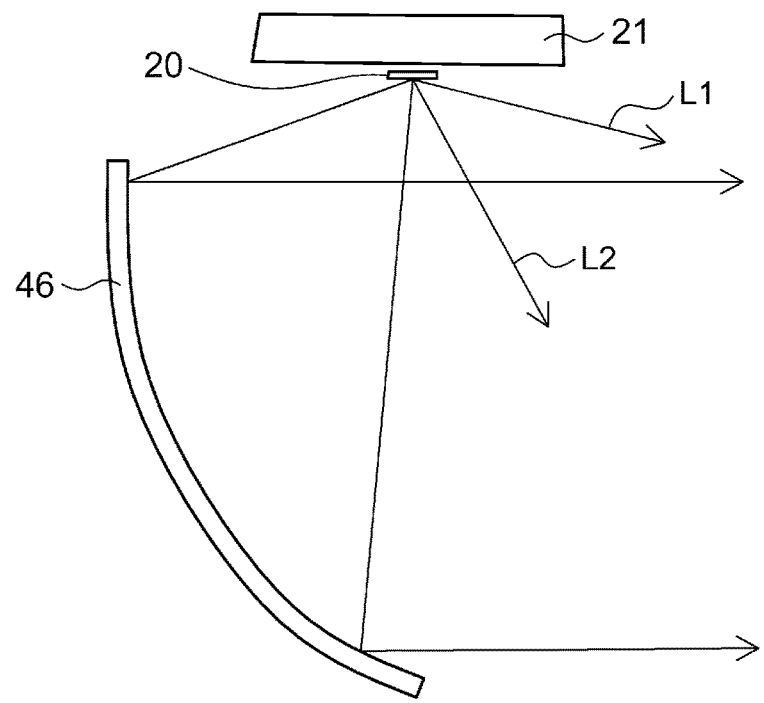
FIG. 16A illustrates reflected light in a case in which a sub-reflector is not present.

However, when the light-emitting element array 20 is not inclined in this manner, as illustrated in FIG. 16A, a portion of the light emitted by the light-emitting elements may result in glare light (light ray L1 illustrated in FIG. 16A) or loss light (light ray L2 illustrated in FIG. 16A) that is not incident on either the reflector 16 or the front cover 14, leading to a problem in that the brightness of the ADB lamp unit 10 decreases.

Figure 16B:
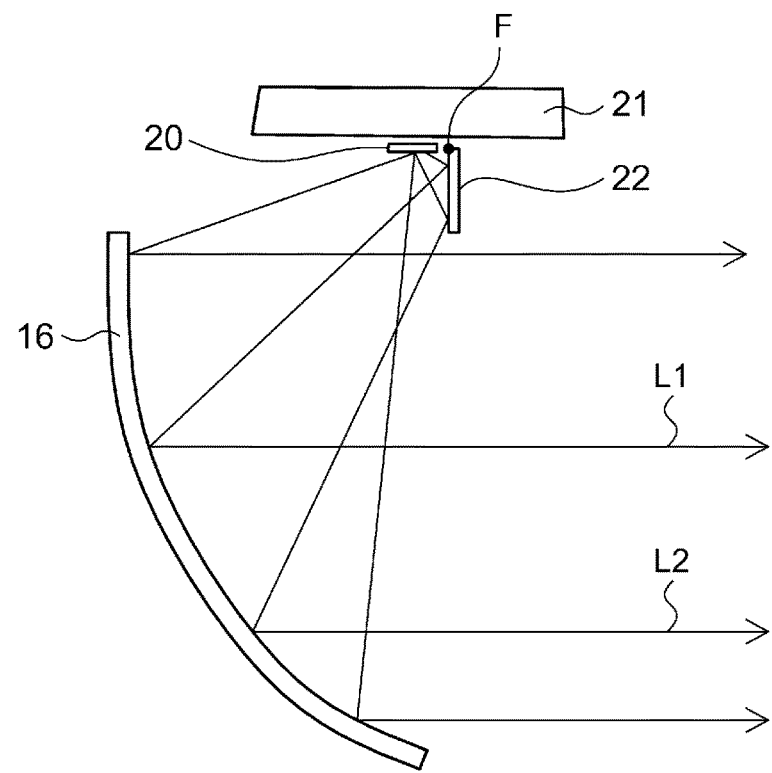
FIG. 16B illustrates reflected light in a case in which a sub-reflector is present.

Therefore, in the present embodiment, a sub-reflector 22 is disposed in the vicinity of the light-emitting element array 20 and on the side opposite to the reflector 16. The sub-reflector 22 is installed perpendicularly or substantially perpendicularly relative to the horizontal plate 18a of the support member 18 so that the sub-reflector 22 extends substantially parallel to the optical axis of the light-emitting element array 20 and includes a reflective surface on a perpendicular portion thereof. With this configuration, as illustrated in FIG. 16B, the light ray L1, which has resulted in glare light, or the light ray L2, which has resulted in the loss light, can be reflected by the reflective surface of the sub-reflector 22 and made incident on the reflective surface of the reflector 16. Thus, providing the sub-reflector 22 makes it possible to achieve both an improvement in the ease of mounting the ADB lamp unit 10 to the vehicle headlamp 100 and the prevention of a decrease in the brightness of the ADB lamp unit 10. When the light-emitting element array 20 is disposed horizontally in this manner, the lamp unit is configured such that the focal point F of the reflector 16 lies at the upper end of the sub-reflector 22.

Figure 17:
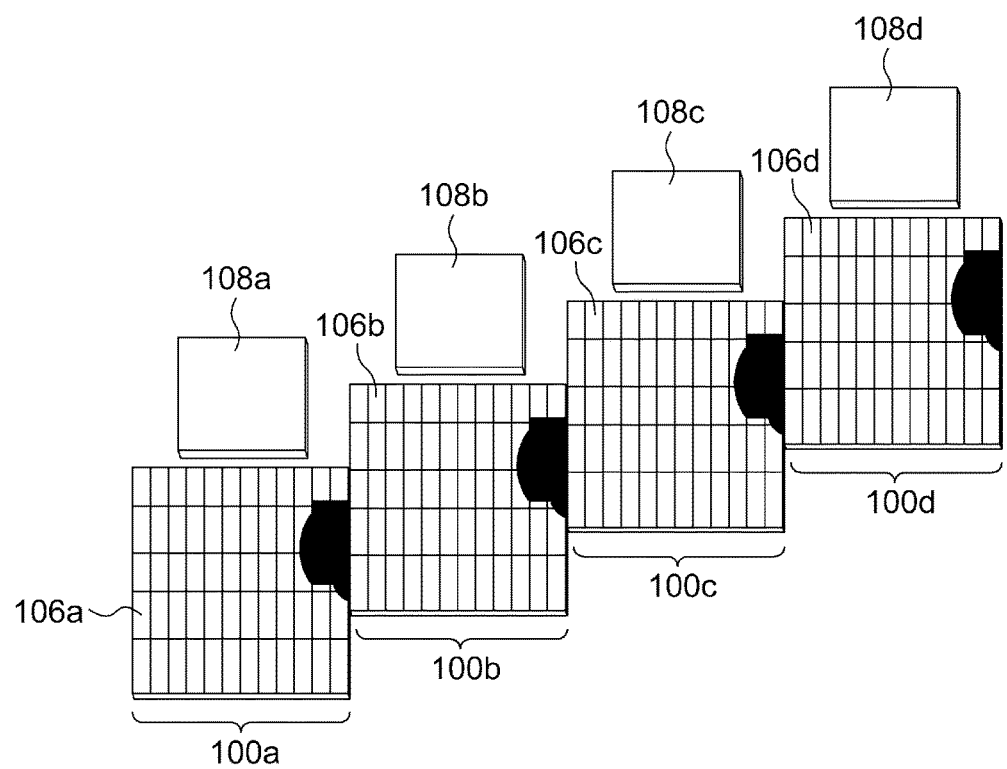
FIG. 17 is a schematic configuration diagram illustrating a modification of the present invention.
Figure 18A:
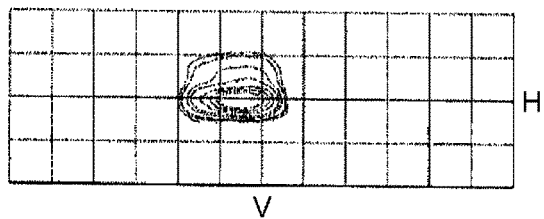
FIG. 18A through 18F illustrates light-distribution patterns according to the modification illustrated in FIG. 17.
Figure 18B:
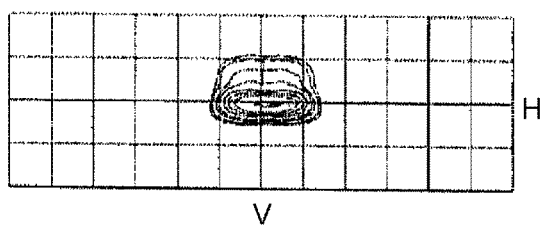
Figure 18C:
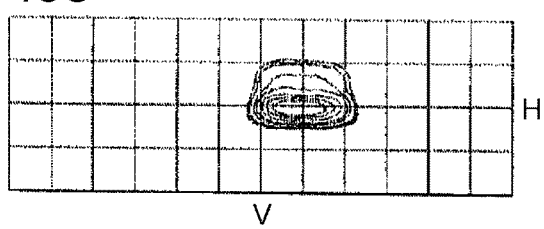
Figure 18D:
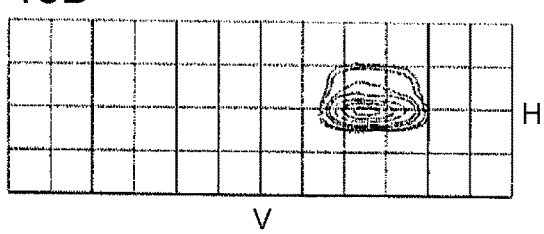
Figure 18E:
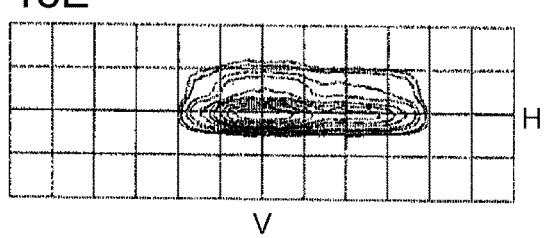
Figure 18F:
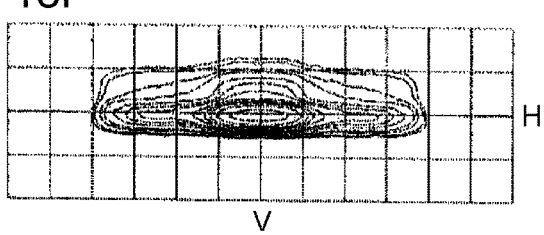
Figure 19:
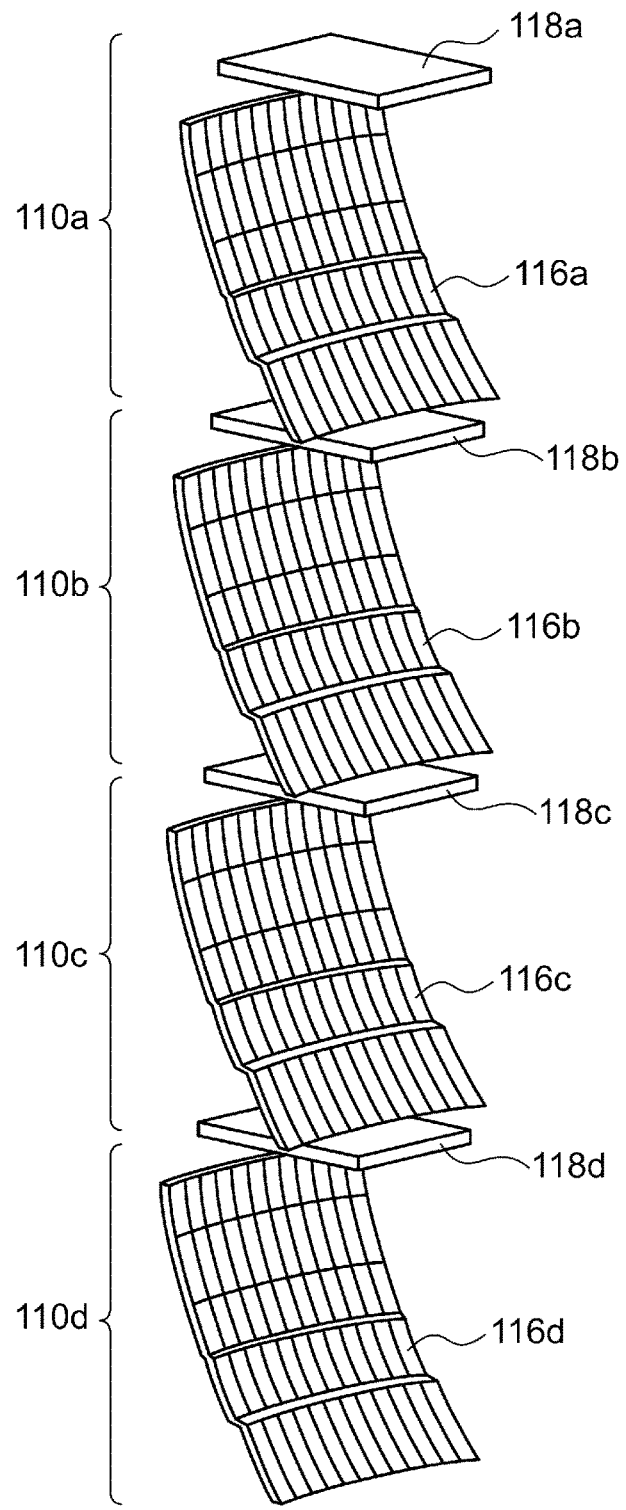
FIG. 19 is a schematic configuration diagram illustrating a modification of the present invention.

FIGS. 17 and 19 are schematic configuration diagrams illustrating modifications of the present invention. FIG. 17 illustrates an example in which a plurality of ADB lamp units 100a through 100d constituting a vehicle headlamp to be mounted on the front right of the vehicle are disposed diagonally as viewed from the front of the vehicle. Disposed in the ADB lamp units 100a through 100d are support members 108a through 108d on the lower surface of which light-emitting element arrays (not illustrated) are disposed and reflectors 106a through 106d each having a reflective surface that is based on a paraboloid of revolution with its focal point F lying on the surface of the light-emitting elements. The reflectors 106a through 106d are each constituted by a plurality of partial reflectors, in a similar manner to the reflector 16 described with reference to FIGS. 1, 2, 3A, and 3B. As an example, the optical axis of the lamp unit 100a is set to −3.5° relative to the front and back direction of the vehicle, the optical axis of the lamp unit 100b is set to 0.5° relative to the front and back direction of the vehicle, the optical axis of the lamp unit 100c is set to 5° relative to the front and back direction of the vehicle, and the optical axis of the lamp unit 100d is set to 13.5° relative to the front and back direction of the vehicle.

A desired high-beam light-distribution pattern is formed by combining the light-distribution patterns formed by the ADB lamp units 100a through 100d. FIGS. 18A through 18F illustrates examples of light-distribution patterns (FIGS. 18A through 18D) formed by the ADB lamp units 100a through 100d, a light-distribution pattern (FIG. 18E) formed by the vehicle headlamp on the right side in which the ADB lamp units 100a through 100d are combined, and a light-distribution pattern (FIG. 18F) formed when the vehicle headlamps on the right and left sides are combined.

FIG. 19 illustrates an example in which a plurality of ADB lamp units 110a through 110d are disposed in the vertical direction as viewed from the front of the vehicle. Disposed in the ADB lamp units 110a through 110d are support members 118a through 118d on the lower surface of which light-emitting element arrays (not illustrated) are disposed and reflectors 116a through 116d each having a reflective surface that is based on a paraboloid of revolution with its focal point F lying on the surface of the light-emitting elements. The reflectors 116a through 116d are each constituted by a plurality of partial reflectors, in a similar manner to the reflector 16 described with reference to FIGS. 1, 2, 3A, and 3B. A desired high-beam light-distribution pattern is formed by combining the light-distribution patterns formed by the ADB lamp units 110a through 110d.

The present invention is not limited to the embodiments described above. It is also possible to combine the embodiments or to make a modification such as various design changes on the basis of the knowledge of a person skilled in the art, and an embodiment obtained by combining the embodiments or by making a modification is also encompassed by the scope of the present invention. A new embodiment generated by combining the embodiments described above or by combining the embodiments described above with the following modified examples provides the effects of the combined embodiments and of the modified examples.

What is claimed is:

1. A vehicle headlamp, comprising:
   a light source constituted by a plurality of individually on/off switching-enabled semiconductor light-emitting elements; and
   a reflector having a reflective surface that is based on a paraboloid of revolution, the reflector being constituted by a perpendicularly split plurality of partial reflectors whose reflective surfaces are each configured such that horizontal spread of reflected light, reflected by the partial reflectors, in a predetermined projection plane is approximately equal for each partial reflector, wherein
   the reflective surface of each of the plurality of partial reflectors comprises a plurality of horizontally split partial reflective surfaces, wherein the horizontal split is in the direction of the width of the vehicle, and wherein at least one of the partial reflectors comprises concave and convex partial reflective surfaces in alternation in the direction of the width of the vehicle such that
   horizontally oriented angles of light reflected by the partial reflective surfaces differ.

2. A vehicle headlamp, comprising:
   a light source constituted by a plurality of individually on/off switching-enabled semiconductor light-emitting elements; and
   a reflector having a reflective surface that is based on a paraboloid of revolution, the reflector being constituted by a perpendicularly split plurality of partial reflectors whose reflective surfaces are each configured such that reflected light reflected by the partial reflectors spreads from an upper end to a lower end of each partial reflector's light-distribution pattern formed on a predetermined projection plane, wherein the reflective surface of each of the plurality of partial reflectors comprises a plurality of horizontally split partial reflective surfaces, wherein the horizontal split is in the direction of the width of the vehicle, and wherein at least one of the partial reflectors comprises concave and convex partial reflective surfaces in alternation in the direction of the width of the vehicle such that horizontally oriented angles of light reflected by the partial reflective surfaces differ.

3. The vehicle headlamp according to claim 1, wherein each partial reflector's vehicle fore-aft position is adjusted such that the partial reflectors' focal lengths decrease with increasing separation of the partial reflectors from the light source.

4. The vehicle headlamp according to claim 1, wherein the partial reflective surfaces are configured such that horizontal directionality of light reflected by the partial reflective surfaces spreads outward from centrally positioned of the partial reflective surfaces to edgewise positioned of the partial reflective surfaces.

5. The vehicle headlamp according to claim 1, wherein:
the light source is disposed such that its optical axis is directed perpendicularly downward; and
a second reflective surface extending approximately parallel to the optical axis of the light source is further provided in proximity to the light source and opposite from the light source's reflector side.

\* \* \* \* \*